July 13, 1954 K. N. FROMM 2,683,809
PULSE GENERATOR
Filed Feb. 28, 1950
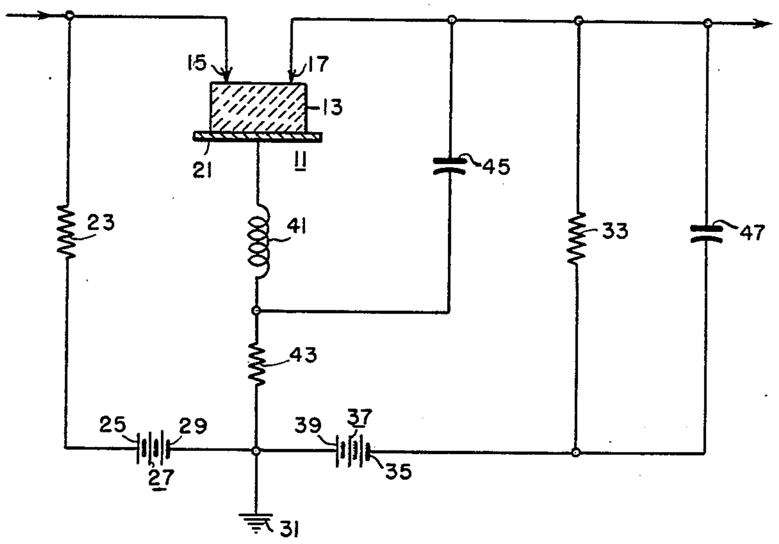
WITNESSES:
E. A. McCloskey.
Wm. T. Wofford
INVENTOR
Kenneth N. Fromm.
BY
Hymen Diamond
ATTORNEY Patented July 13, 1954 2,683,809

UNITED STATES PATENT OFFICE 2,683,809

PULSE GENERATOR

Kenneth N. Fromm, Pittsburgh, Pa., assignor to Westinghouse Electric Corporation, East Pittsburgh, Pa., a corporation of Pennsylvania Application February 28, 1950, Serial No. 146,716

8 Claims. (Cl. 250—36)

My invention relates to electronic circuits and more particularly to pulse generating circuits of the type designed to produce a series of spaced pulse groups or trains.

Circuits for producing pulse trains in accordance with the teachings of the prior art, of which I am aware, each include a plurality of electric discharge devices. Each of such devices calls for associated components which, together with the device, results in complex, bulky and costly structure.

It is accordingly an object of my invention to provide a pulse generator of the type designed to produce a series of spaced pulse groups which is more compact and less costly than prior art apparatus performing a similar function.

It is another object of my invention to provide a pulse generator of the above-mentioned type, which shall require a minimum of circuit components.

It is another object of my invention to provide a versatile pulse generator of a type designed to produce a series of spaced pulse groups.

It is another object of my invention to provide a pulse generator of the above-mentioned type in which the number of pulses per group, the spacing between pulse groups, the pulse repetition frequency, and the steepness of the rise and decay of individual pulses may be conveniently varied.

Recent developments in the art of solid conduction have produced a device which can perform some of the functions of a vacuum tube. This device, termed a transistor, comprises a block of semi-conductive material such as silicone or germanium with which are associated three electrodes. Two of these electrodes, called the emitter and collector, are conductive probes having relatively small contact areas, and are located in proximity to each other on one face of the semiconductive block. The third electrode, called a base electrode which is a conductor having a relatively large contact area, is placed contiguous to the opposite face of the semi-conductive block.

In accordance with my invention, I provide a novel pulse generator circuit utilizing a transistor. A pulse generator constructed in accordance with my invention is versatile in operation, and is simple and compact in structure.

My invention, together with additional objects and advantages thereof, will be best understood from the following description taken in connection with the accompanying drawing in which the single figure is a schematic diagram showing a preferred embodiment of my invention.

In the drawing, there is shown a semi-conductive device which may be a transistor indicated generally at 11. The transistor 11 comprises a block of semi-conductive material 13 which may be silicone or germanium and with which are associated emitter, collector and base electrodes, 15, 17 and 21, respectively. The emitter and collector electrodes 15, 17 are pin-pointed conductive probes which are located in proximity to each other on one face of the semi-conductive block 13. The base electrode 21 is a plate of conductive material which is placed contiguous to the opposite face of the semi-conductive block 13. The emitter electrode 15 is connected through a first resistance 23 to the positive terminal 25 of a direct current bias potential source which is shown as a battery 27 whose negative terminal 29 is connected to ground at 31. The collector electrode 17 is connected through a second resistance 33 to the negative terminal 35 of a direct current bias potential source which is shown as a battery 37 whose positive terminal 39 is connected to ground at 31. The base electrode 21 is connected through an inductance 41 and in series with a third resistance 43 to ground at 31. A first capacitor 45 is connected from the collector electrode 17 to the junction of the said inductance 41 and third resistance 43. A second capacitor 47 may be connected in shunt with said second resistance 33 for a purpose to be hereinafter described. The output of the pulse generator may be taken from the collector electrode.

The circuit just described has been used by the applicant to produce spaced pulse groups, with good results. In actual practice the following circuit constants were used and parameters noted: first resistance, 10,000 ohms; second resistance, 30,000 ohms; third resistance, 3,500 ohms; inductance, 8 henrys; emitter bias potential source, 2.1 volts; collector bias potential source, 35 volts; first capacitance, .01 microfarad (to produce 4 pulses per cycle), .006 microfarad (to produce 3 pulses per cycle), .002 microfarad (to produce 2 pulses per cycle); emitter current, .75 milliampere; collector current, 1.7 milliamperes.

The pulse generator herein disclosed has proved versatile in its operation. The desired distance between pulse groups may be selected by changing the magnitude of one or more of the resistances 23, 43, 33. The frequency of repetition is varied preferably by changing the magnitude of the inductance 41. The second capacitance 47 is not essential to operation of the pulse generator. However, the steepness of rise and decay of individual pulses may be varied by addition of the second capacitor 47. If it is desired to synchronize the output pulses with another signal, a synchronizing signal may be applied to the emitter electrode 15.

The pulse generator of my invention does not incorporate the plurality of tubes and associated components which were necessary in pulse generators of the prior art, for I have, therefore, provided a pulse generator of the type, performing a similar function, designed to produce a series of spaced pulse groups which is not only versatile in operation, but which is also of compact, simple and economical construction.

I am aware that certain modifications could be made without departing from the scope of my invention. I desire, therefore, to be limited only in so far as is necessitated by the prior art and the spirit of the appended claims.

I claim as my invention:

1. A pulse generator circuit including a device consisting of a semi-conducting material provided with one electrode having a relatively large contact area, and two electrodes having relatively small contact areas, means for applying a positive bias voltage to one of said electrodes having a small contact area, means for applying a negative bias voltage to said other electrode having a small contact area, an inductance connected from said electrode having a large contact area through a resistance to ground, and a capacitance connected from the junction of said inductance and resistance to said other electrode having a small contact area.

2. A pulse generator including a device of the semi-conductive type having emitter, collector, and base electrodes, means for applying operating potentials to said emitter and collector electrodes, an inductance, a resistance, means for connecting said inductance and resistance in series from said base electrode to ground, a capacitance, and means connecting said capacitance between said collector electrode and the junction of said inductance and resistance.

3. A pulse generator of the type designed to produce a series of spaced pulse groups, comprising a device of the semi-conductive type having emitter, collector, and base electrodes, means for applying biasing potentials to said emitter and collector electrodes, an inductance and a resistance, said inductance being connected from said base electrode through said resistance to ground, and a capacitance connected from said collector electrode to the junction of said inductance and resistance.

4. A pulse generator of the type designed to produce a series of spaced pulse groups, comprising a device of the semi-conductive type having emitter, collector, and base electrodes, bias means connected in series with a resistance between said emitter electrode and ground, bias means connected in series with a resistance between said collector electrode and ground, an inductance and a resistance connected in series between said base electrode and ground, and a capacitance connected from said collector electrode to the junction of said inductance and resistance.

5. A pulse generator of the type designed to produce a series of spaced pulse groups, comprising a device of the semi-conductive type having emitter, collector, and base electrodes, a source of direct current potential connected in series with a resistance between said emitter electrode and ground so as to positively bias said emitter electrode, a source of direct current potential connected in series with a resistance between said collector electrode and ground so as to negatively bias said collector electrode, an inductance and a resistance connected from said base electrode to ground, and a capacitance connected between said collector electrode and the junction of said last-mentioned resistance and inductance.

6. A pulse generator of the type designed to produce a series of spaced pulse groups, comprising a device of the semi-conductive type having emitter, collector, and base electrodes, a source of direct current potential connected in series with a resistance between said emitter electrode and ground so as to positively bias said emitter electrode, a source of direct current potential connected in series with a resistance between said collector electrode and ground so as to negatively bias said collector electrode, a capacitance shunting said last-mentioned resistance, an inductance and a resistance connected from said base electrode to ground, and a capacitance connected between said collector electrode and the junction of said last-mentioned resistance and inductance.

7. A pulse generator of the type designed to produce a series of spaced pulse groups, comprising a device of the semi-conductor type having emitter, collector, and base electrodes, means for applying operating potentials to said device, a first time constant network comprising resistance and inductance and connected in the base electrode circuit, a second time constant network comprising resistance and capacitance, and connected in the collector electrode circuit, said last-mentioned resistance including the resistance of said first time constant network.

8. The invention in accordance with claim 7 wherein the time constant of said first network is large compared to the time constant of said second network.

References Cited in the file of this patent

UNITED STATES PATENTS

| Number | Name | Date |
|---|---|---|
| 2,127,005 | Nichols et al. | Aug. 16, 1938 |
| 2,196,845 | Andrieu | Apr. 9, 1940 |
| 2,469,569 | Ohl | May 10, 1949 |
| 2,517,960 | Barney et al. | Aug. 8, 1950 |
| 2,524,035 | Bardeen et al. | Oct. 3, 1950 |

OTHER REFERENCES

Article in RCA Review for March 1949, "Some Novel Circuits for the Three-Terminal Semiconductor Amplifier," by Webster et al., pages 14 and 15.

Radar Electronic Fundamentals, Bureau of Ships, Navy Dept., June 1944, pages 219, 220, and 221.